United States Patent
Lee et al.

(10) Patent No.: US 9,791,916 B2
(45) Date of Patent: Oct. 17, 2017

(54) CONTROL CIRCUIT INCLUDING LOAD SWITCH, ELECTRONIC APPARATUS INCLUDING THE LOAD SWITCH, AND CONTROL METHOD THEREOF

(71) Applicant: SAMSUNG ELECTRONICS CO., LTD., Suwon-si (KR)

(72) Inventors: Jin-hyung Lee, Anyang-si (KR); Gil-yong Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 14/511,635

(22) Filed: Oct. 10, 2014

(65) Prior Publication Data
US 2015/0253743 A1    Sep. 10, 2015

(30) Foreign Application Priority Data

Mar. 10, 2014 (KR) .................. 10-2014-0027809

(51) Int. Cl.
| | | |
|---|---|---|
| *H01H 35/00* | (2006.01) | |
| *H01H 83/00* | (2006.01) | |
| *G06F 3/00* | (2006.01) | |
| *G06F 1/26* | (2006.01) | |
| *H02H 9/00* | (2006.01) | |

(52) U.S. Cl.
CPC ............... *G06F 3/00* (2013.01); *G06F 1/26* (2013.01); *H02H 9/002* (2013.01); *Y10T 307/766* (2015.04)

(58) Field of Classification Search
CPC .. G06F 3/00; G06F 1/26; H02H 9/002; Y10T 307/766
See application file for complete search history.

(56) References Cited

U.S. PATENT DOCUMENTS

| | | | | |
|---|---|---|---|---|
| 6,188,210 B1 * | 2/2001 | Tichauer | ................. | G05F 1/468 323/273 |
| 6,617,833 B1 * | 9/2003 | Xi | ........................... | G05F 1/468 323/280 |
| 6,636,025 B1 * | 10/2003 | Irissou | .................... | H02M 1/32 323/313 |
| 7,248,026 B2 * | 7/2007 | Ritter | ...................... | G05F 1/575 323/274 |
| 7,459,891 B2 * | 12/2008 | Al-Shyoukh | ........... | G05F 1/468 323/274 |
| 7,576,525 B2 | 8/2009 | So et al. | | |
| 2002/0135235 A1 * | 9/2002 | Winick | .................. | H02J 1/102 307/87 |
| 2008/0024099 A1 * | 1/2008 | Oki | ........................ | H02M 1/08 323/282 |
| 2014/0085756 A1 * | 3/2014 | Lin | .......................... | G05F 1/56 361/18 |

(Continued)

FOREIGN PATENT DOCUMENTS

KR    10-2009-0080095 A    7/2009

*Primary Examiner* — Jared Fureman
*Assistant Examiner* — Esayas Yeshaw
(74) *Attorney, Agent, or Firm* — Sughrue Mion, PLLC

(57) ABSTRACT

A control circuit is provided. The control circuit includes a load switch, and a controller configured to transfer a turn-on signal which is increased step by step to the load switch, and perform a soft start operation which turns on the load switch. In response to the load switch being turned on, the control circuit restricts an inrush current flowing in the load switch.

16 Claims, 5 Drawing Sheets

(56) References Cited

U.S. PATENT DOCUMENTS

2014/0101463 A1* 4/2014 Ju ............................ G06F 1/26
　　　　　　　　　　　　　　　　　　　　　　713/300
2014/0132418 A1* 5/2014 Lill .................... G05B 19/0428
　　　　　　　　　　　　　　　　　　　　　　340/679

* cited by examiner

CONTROL CIRCUIT INCLUDING LOAD SWITCH, ELECTRONIC APPARATUS INCLUDING THE LOAD SWITCH, AND CONTROL METHOD THEREOF

CROSS-REFERENCE TO RELATED APPLICATION

This application claims priority from Korean Patent Application No. 10-2014-0027809, filed on Mar. 10, 2014, in the Korean Intellectual Property Office, the disclosure of which is incorporated herein by reference in its entirety.

BACKGROUND

1. Field

Apparatuses and methods consistent with exemplary embodiments relate to a control circuit including a load switch, and more particularly, to a control circuit which restricts an inrush current generated in a load switch in turn-on of the load switch.

2. Description of the Related Art

Electronic apparatuses receive various kinds of voltages and use the voltages. However, to reduce power used in a standby mode, unused voltages need to be blocked. Load switches are generally used to block the voltages.

The load switch is a switch which blocks voltages and is configured to prevent damage to and the loss of a power supply apparatus, and to maintain a standby mode function of an electronic product. However, the inrush current is generated when the load switch is turned on. The inrush current is a transient current generated to charge a capacitor of an output when the load switch is turned on.

In response to the inrush current being generated in the load switch, the inrush current becomes larger than a general usage current. Therefore, current capacity of a component (for example, a transistor) used for the load switch has to be large.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide a control circuit which restricts an inrush current flowing in a load switch when the load switch is turned on, an electronic apparatus including the load switch, and a switch control method thereof.

According to an aspect of an exemplary embodiment, there is provided a control circuit. The control circuit may include: a load switch; and a controller configured to transfer a turn-on signal which is increased step by step to the load switch, and perform a soft start operation which turns on the load switch.

The controller may include a pull-up resistor connected to a bias power source, a general-purpose input/output (GPIO) port connected to the load switch, and a switch configured to connect the pull-up resistor and the GPIO port. The controller may control the turn-on signal, which is increased step by step, to be output through the GPIO port by repeatedly turning on/off the switch in response to the load switch being turned on.

Alternatively, the load switch may include a metal oxide silicon field effect transistor (MOSFET) switch, and a bipolar junction transistor (BJT) switch. A base terminal of the BJT switch may be connected to the GPIO port, and a collector terminal of the BJT switch may be connected to a gate terminal of the MOSFET switch.

The controller may control the turn-on signal, which is increased step by step, to be output through the GPIO port by repeatedly turning the switch on and off in a frequency range of 50 KHz to 400 KHz.

According to an aspect of an exemplary embodiment, there is provided a method of controlling a switch of an electronic apparatus including a load switch. The method may include: determining whether or not an event, which allows the load switch to be turned on, is generated, and transferring a turn-on signal which is increased step by step to the load switch, and performing a soft start operation which turns on the load switch, in response to the event being generated.

The performing of the soft start operation may include generating the turn-on signal by repeatedly turning on/off a switch configured to connect a general-purpose input/output (GPIO) port connected to the load switch and a pull-up resistor connected to a bias power source.

Alternatively, the performing of the soft start operation may include generating the turn-on signal by repeatedly turning the switch on and off in a frequency range of 50 KHz to 400 KHz.

According to an aspect of an exemplary embodiment, there is provided an electronic apparatus. The electronic apparatus may include: a connection unit to which an external apparatus is connectable; a load switch connected to the connection unit; a switch controller configured to automatically turn on the load switch in response to the external apparatus being connected; and a controller configured to automatically recognize the external apparatus, and perform a control operation corresponding to the external apparatus, in response to the load switch being turned on. In response to the external apparatus being connected, the switch controller may transfer a turn-on signal which is increased step by step to the load switch, and perform a soft start operation which turns on the load switch.

Alternatively, the switch controller may include a pull-up resistor connected to a bias power source, a general-purpose input/output (GPIO) port connected to the load switch, and a switch configured to connect the pull-up resistor and the GPIO port. The switch controller may control the turn-on signal, which is increased step by step, to be output through the GPIO port by repeatedly turning on/off the switch in response to the load switch being turned on.

The load switch may include a metal oxide silicon field effect transistor (MOSFET) switch, and a bipolar junction transistor (BJT) switch. A base terminal of the BJT switch may be connected to the GPIO port, and a collector terminal of the BJT switch may be connected to a gate terminal of the MOSFET switch.

The switch controller may control the turn-on signal, which is increased step by step, to be output through the GPIO port by repeatedly turning the switch on and off in a frequency range of 50 KHz to 400 KHz.

According to the above-described various exemplary embodiments, the inrush current flowing into a load switch may be restricted in response to the load switch being turned on. Therefore, the load switch having a small capacity may be used in a control circuit, and thus cost may be reduced, and device efficiency may be improved.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
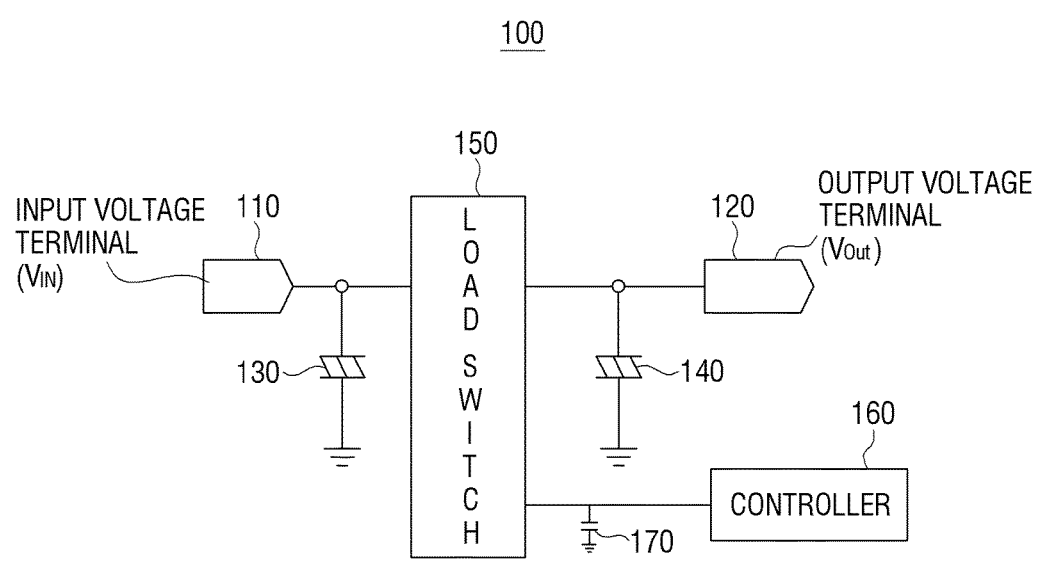
FIG. 1 is a schematic block diagram illustrating a control circuit including a load switch according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a schematic block diagram illustrating a control circuit including a load switch to an exemplary embodiment.

Referring to FIG. 1, the control circuit includes an input voltage (Vin) terminal 110, an output voltage (Vout) terminal 120, a plurality of capacitors 130, 140, and 170, a load switch 150, and a controller 160.

The input voltage (Vin) terminal 110 is a terminal to which a voltage is supplied. Various voltages (for example, 5 V) may be applied to the input voltage terminal 110, and current may flow in the capacitor 130, and the load switch 150.

The load switch 150 is a switch which allows current to flow from the input voltage terminal 110 to the output voltage terminal 120. In response to the load switch 150 being turned on, the current may flow from the input voltage terminal 110 to the output voltage terminal 120. In response to the load switch 150 being turned off, the current may not flow from the input voltage terminal 110 to the output voltage terminal 120.

In response to the load switch 150 being turned on, the current may flow to the output voltage terminal 120.

The plurality of capacitors 130 and 140 are components which are typically used in a circuit for the load switch 150, and a voltage applied to the input voltage terminal 110 may be provided to the capacitors 130 and 140.

The load switch 150 may be further configured by coupling additional electronic devices to it. For example, the load switch 150 may include a metal oxide semiconductor field effect transistor (MOSFET) device, and a bipolar junction transistor (BJT) device. The load switch 150 may include additional devices other than the above-described devices in response to the switch being controlled so as to turn on and off according to a certain rule.

The controller 160 may transfer a turn-on signal which is increased step by step to the load switch 150, and perform a soft start operation which turns on the load switch 150. For example, the controller 160 may include a micro control unit (MCU). In response to the load switch being turned on, the controller 160 may be configured to have a soft start function and may restrict the inrush current. The soft start function may be configured to gradually increase an applied voltage to restrict the inrush current in response to the load switch being turned on. The inrush current is a transient current generated to charge a capacitor of an output in response to the load switch being turned on. Detailed description thereof will be described later.

A voltage applied from the controller 160 may be provided to the capacitor 170.

In response to the purpose for restricting the inrush current, various devices (capacitor, transistor, or the like) may be included in addition to the components of the control circuit described in FIG. 1.

Figure 2:
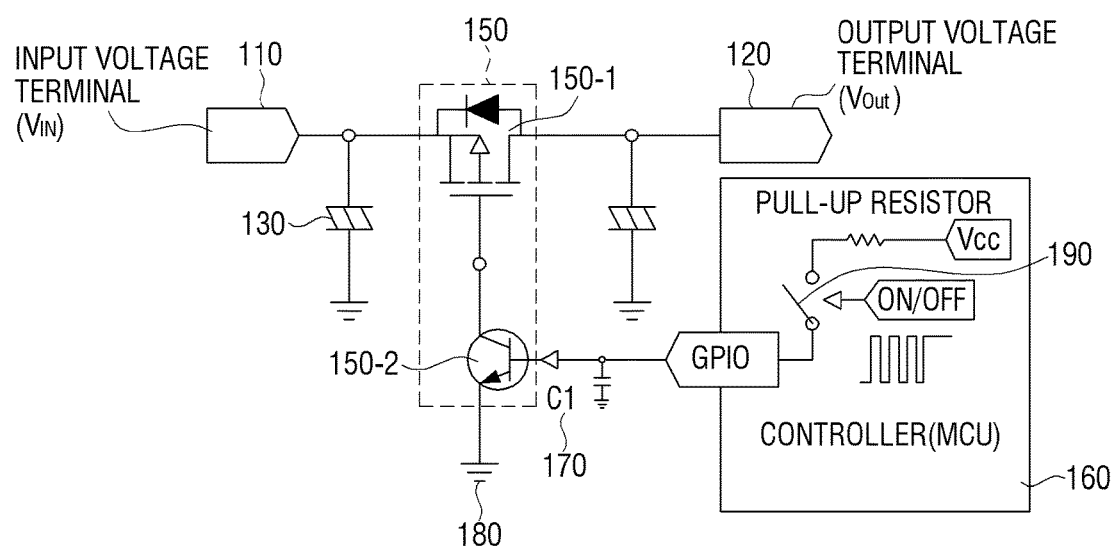
FIG. 2 is a view illustrating a control circuit including a load switch according to an exemplary embodiment.

FIG. 2 is a view illustrating a control circuit including a load switch according to an exemplary embodiment.

Referring to FIG. 2, the load switch 150 includes a p-channel MOSFET switch 150-1 and an NPN BJT switch 150-2. A base terminal of the BJT switch 150-2 may be connected to a GPIO port, and a collector terminal of the BJT switch 150-2 may be connected to a gate terminal of the MOSFET switch 150-1. In response to a HIGH signal being applied to the GPIO port from the controller 160 which is a MCU, current may flow from the BJT switch 150-2 toward a ground 180. In response to a LOW signal being applied to the GPIO port of the controller 160, current may flow from the BJT switch 150-2 toward the gate terminal of the p-channel MOSFET switch 150-1.

Here, other than the above-described devices, the load switch 150 may be configured of various devices (for example, N-channel MOSFET and PNP BJT), or the like in response to the load switch 150 being turned on/off according to a certain rule.

The MCU 160 includes a pull-up resistor, a GPIO port, and the like therein. The MCU may include an analog circuit to control the on and off configuration of the pull-up resistor, and may also control the on and off configuration of the pull-up resistor in hardware or software. For example, a switch may be provided between the GPIO port and the pull-up resistor to control the on and off configuration of the pull-up resistor. In response to the pull-up resistor being turned on by the MCU, a HIGH signal may be output to the GPIO port, and in response to the pull-up resistor being turned off by the MCU, a LOW signal may be output to the GPIO port.

The MCU 160 turns on and off the pull-up resistor at a high speed for a short duration of time, and thus a voltage of the capacitor 170 connected to the MCU 160 is gradually increased. A turn-on delay is generated in the P-channel MOSFET switch 150-1 of the load switch 150 since the voltage of the capacitor 170 is gradually increased. The turn-on delay may be generated in the p-channel MOSFET switch 150-1, and thus a turn-on inrush current of the p-channel MOSFET switch 150-1 may be restricted. That is, in response to the load switch 150 being turned on by the MCU 160, the MCU 160 may control a turn-on signal, which is increased step by step, to be output through the GPIO port by repeatedly turning on/off the switch 190.

The MCU 160 may control the turn-on signal, which is increased step by step, to be output through the GPIO port by repeatedly turning the switch on and off 190 in a frequency range of 50 KHz to 400 KHz. For example, the MCU 160 may turn the switch 190 on and off 10 ten million times per second. Here, it has been described that the number of on and off repetitions of the switch 190 per second is limited in the frequency range of 50 KHz to 400 KHz. However, the number of on and off repetitions of the switch 190 per second may be set through without the frequency limitation in response to the output voltage of the GPIO port being increased step by step.

FIG. 3(a) to FIG. 3(e) are views illustrating operation processes of components in response to the load switch 150 being turned on according to an exemplary embodiment.

The operation will be described with reference to FIG. 3(a) to FIG. 3(e) with FIG. 2.

In response to the load switch 150 being turned on, the controller 160, that is, the MCU 160 may be electrically connected to the load switch 150, and sense on the activation of the load switch 150.

Figure 3:
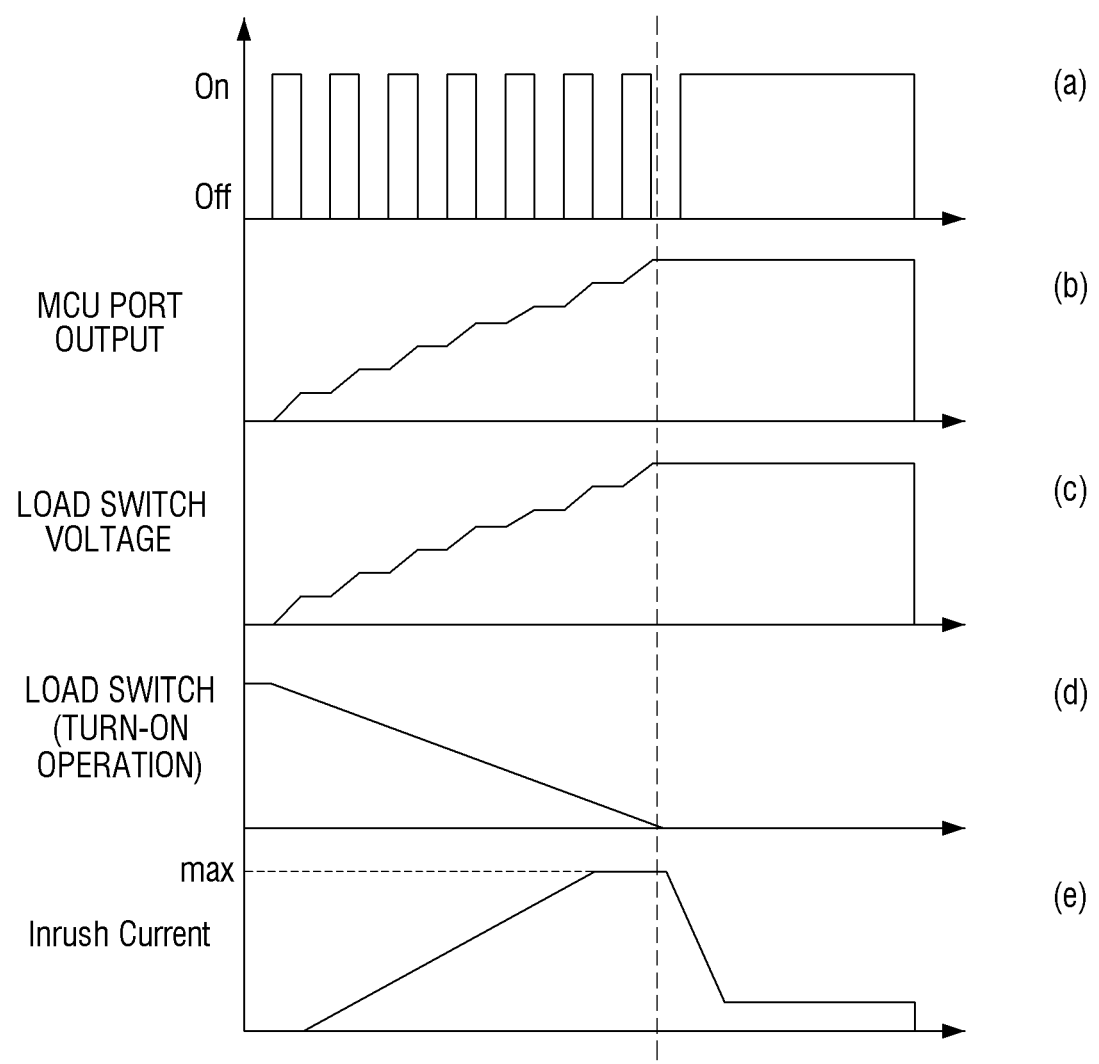
FIG. 3 shows views illustrating operation processes of components in response to a load switch being turned on according to an exemplary embodiment.

After the MCU 160 detects the turn-on of the load switch 150, the MCU 160 repeatedly turns on/off the switch 190 at a high speed. The number of high-speed on and off repetitions is determined according tow the performance of the MCU 160. The MCU 160 may set that the switch 190 is repeatedly turned on and off in a range of 50 KHz to 400 KHz. As illustrated in FIG. 3(a), in response to the load switch 150 being turned on, the MCU 160 turns the pull-up resistor on and off at a high speed.

In response to the MCU 160 repeatedly turning the pull-up resistor on and off, and the pull-up resistor being turned on, a voltage of the capacitor (C1) 170 is gradually increased, and an output of the GPIO port in the MCU 160 has a positive slope, and is gradually increased. In response to the pull-up resistor being turned off, the output of the GPIO port is maintained as constant. That is, as illustrated in FIG. 3(b), in response to the load switch being turned on, the output of the GPIO port is increased in a stepwise form. Thus, as illustrated in FIG. 3(c), a voltage of the load switch 150 is also increased in a stepwise form.

At this time, a gate voltage of the MOSFET for the load switch 150 is gradually changed. Therefore, a turn-on delay of the MOSFET is generated, and the MOSFET operates in an active (ohmic) region and restricts the inrush current to the MOSFET. In response to the load switch 150 being turned on, the soft start function may be realized. As illustrated in FIGS. 3(d) and (e), the inrush current is gradually increased, and reaches a maximum value in the end of the turn-on operation of the load switch 150. In response to the turn-on operation of the load switch 150 being completed, the inrush current of the load switch 150 is also abruptly reduced.

Here, it has been described that the output of the GPIO port is gradually increased in response to the pull-up resistor being turned on, and the output of the GPIO port is maintained in a constant state in response to the pull-up resistor being turned off. However, through a change of components and the circuit layout, the output of the GPIO port may be maintained in response to the pull-up resistor being turned on, and the output of the GPIO port may be gradually increased in response to the pull-up resistor being turned off.

Figure 4:
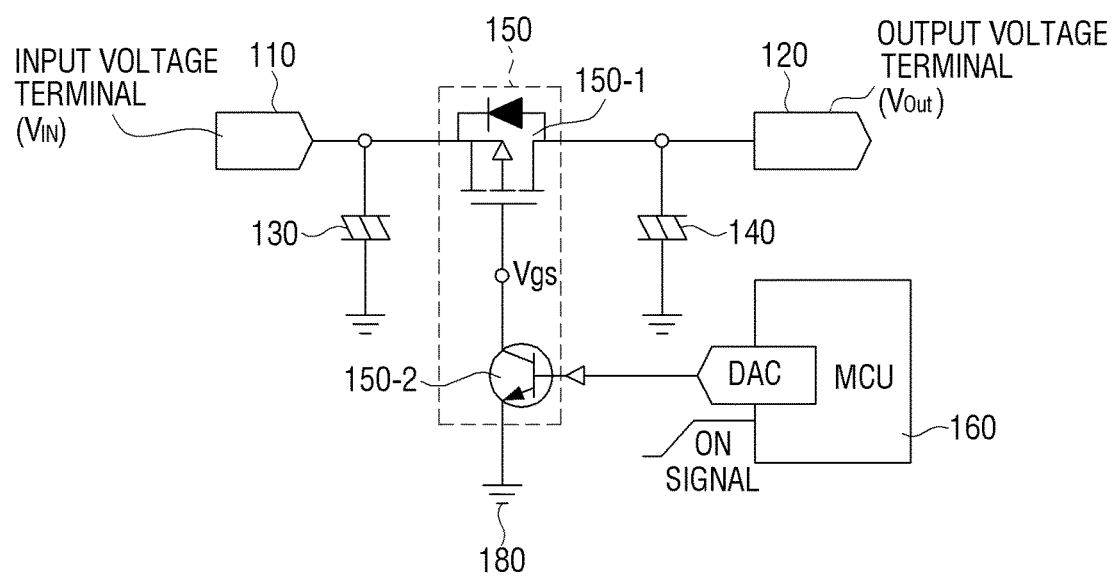
FIG. 4 is a view illustrating a control circuit including a load switch according to another exemplary embodiment.

FIG. 4 is a view illustrating a control circuit including a load switch according to another exemplary embodiment.

Referring to FIG. 4, a load switch 150 includes a p-channel MOSFET switch 150-1 and an NPN BJT switch 150-2. A base terminal of the BJT switch 150-2 may be connected to a digital to analog converter (DAC) port, and a collector terminal of the BJT switch 150-2 may be connected to a gate terminal of the MOSFET switch 150-1. In response to a HIGH signal applied to the GPIO port from the controller 160 which is a MCU, current may flow from the BJT switch 150-2 toward a ground 180. In response to a LOW signal applied to the GPIO port from the controller 160, current may flow from the BJT switch 150-2 toward the gate terminal of the p-channel MOSFET switch 150-1.

Here, other than the above-described devices, the load switch 150 may be configured using various devices (for example, N-channel MOSFET and PNP BJT), or the like, in response to the load switch 150 being turned on/off according to a certain rule. The MCU 160 includes a DAC therein. At this time, a turn-on delay is generated in the P-channel MOSFET switch 150-1 of the load switch 150 since the voltage of the capacitor 170 is gradually increased. The turn-on delay may be generated in the p-channel MOSFET switch 150-1, and thus a turn-on inrush current of the p-channel MOSFET switch 150-1 may be restricted. That is, in response to the load switch 150 being turned on, the MCU 160 may gradually increase a voltage of the DAC port, and thus restrict the inrush current of the load switch 150.

Figure 5:
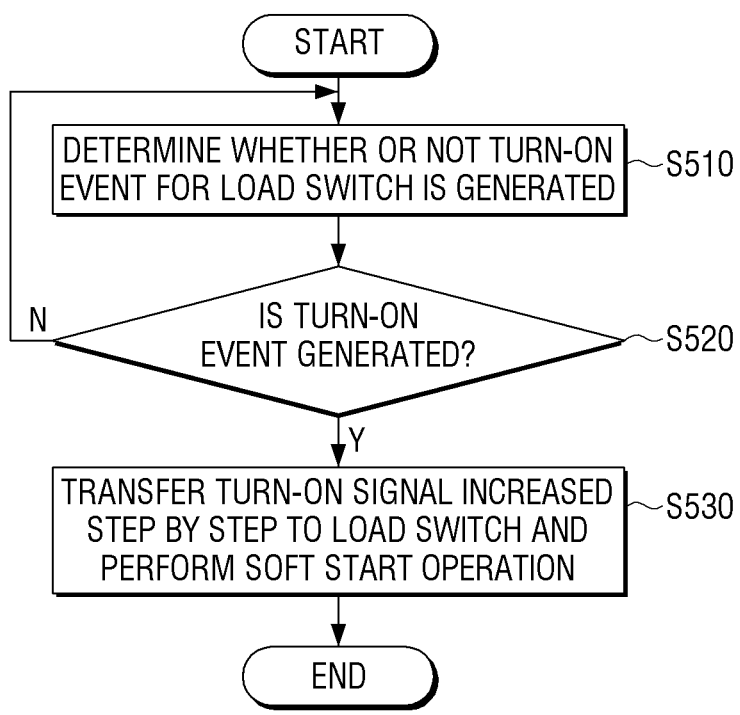
FIG. 5 is a flowchart illustrating a method of controlling a switch of a control circuit according to another exemplary embodiment.

FIG. 5 is a flowchart illustrating a switch control method of a control circuit according to an exemplary embodiment.

First, the control circuit determines whether an event, which allows the load switch to have to be turned on, is generated (S510). The switch control method will be described by exemplifying a universal serial bus (USB) switching circuit among power supply apparatuses of a personal computer (PC). In response to a USB external device being connected through the USB of the PC by a user, it may be regarded that the event, which allows the load switch to have to be turned on, is generated.

At this time, in response to the event being generated, which allows the load switch to be turned on, (S520), the control circuit transfers a turn-on signal which is increased step by step to the load switch, and performs a soft start operation which turns on the load switch (S530). Detailed description thereof has been made above, and will be omitted.

Here, in operation S530 of performing the soft start operation, the turn-on signal may be generated by repeatedly turning on and off a MCU switch configured to connect a GPIO port connected to the load switch and a pull-up resistor connected to a bias power source.

At this time, the control circuit may generate the turn-on signal by repeatedly turning the MCU switch on and off in a frequency range of 50 KHz to 400 KHz.

An electronic apparatus according to another exemplary embodiment may include a connection unit to which an external apparatus is connectable, a load switch connected to the connection unit, a switch controller configured to automatically turn on the load switch in response to the external apparatus being connected, and a controller configured to automatically recognize the external apparatus in response to the load switch being turned on, and perform a control operation corresponding to the external apparatus. For example, the electronic apparatus may be a power supply apparatus of a PC.

At this time, in response to the external apparatus being connected, the switch controller may transfer the turn-on signal which is increased step by step to the load switch, and perform the soft start operation which turns on the load switch.

Here, the switch controller may include a pull-up resistor connected to the bias power source, a GPIO port connected to the load switch, and a MCU switch configured to connect the pull-up resistor and the GPIO port. In response to turning on the load switch, the switch controller may control the turn-on signal, which is increased step by step, to be output through the GPIO port by repeatedly turning the MCU switch on and off.

At this time, the road switch may include a MOSFET switch and a BJT switch. A base terminal of the BJT switch may be connected to the GPIO port, and a collector terminal of the BJT switch may be connected to a gate terminal of the MOSFET switch.

Further, the switch controller may control the turn-on signal, which is increased step by step, to be output through the GPIO port by repeatedly turning on/off the switch in a range of 50 KHz to 400 KHz.

The switch control methods according to the above-described exemplary embodiments, which transfer the turn-on signal which is increased step by step to the load switch, and perform the soft start operation which turns on the load switch, may be coded in software. The software may be stored in a non-transitory computer-readable medium, and used in an apparatus such as a display apparatus or a glasses apparatus.

The non-transitory computer-readable medium is not a medium configured to temporarily store data such as a register, a cache, or a memory but an apparatus-readable medium configured to semi-permanently store data. Specifically, the above-described programs (or methods) may be stored in the non-transitory apparatus-readable medium such as a compact disc (CD), a digital versatile disc (DVD), a hard disc, a Blu-ray disc, a USB, a memory card, or a read only memory (ROM), and provided.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A control circuit comprising:
a load switch; and
a controller configured to transfer a turn-on signal to the load switch, and perform a soft start operation which turns on the load switch,
wherein the controller includes:
a pull-up resistor connected to a bias power source;
a general-purpose input/output (GPIO) port connected to the load switch; and
a switch configured to connect the pull-up resistor and the GPIO port,
wherein, in response to the load switch being turned on, the controller turns the switch on and off repeatedly.

2. The control circuit as claimed in claim 1, wherein, in response to the switch being turned on and off repeatedly, an output voltage through the GPIO port is increased step by step.

3. The control circuit as claimed in claim 2, wherein the load switch includes:
a metal oxide silicon field effect transistor (MOSFET) switch; and
a bipolar junction transistor (BJT) switch,
wherein a base terminal of the BJT switch is connected to the GPIO port, and a collector terminal of the BJT switch is connected to a gate terminal of the MOSFET switch.

4. The control circuit as claimed in claim 2, wherein the controller turns the switch on and off repeatedly in a frequency range of 50 KHz to 400 KHz.

5. A method of controlling a switch of an electronic apparatus including a load switch, the method comprising:
determining whether or not an event, which allows the load switch to be turned on, is generated; and
transferring a turn-on signal to the load switch, and performing a soft start operation which turns on the load switch, in response to the event being generated,
wherein the performing of the soft start operation includes turning a switch on and off repeatedly, the switch being located inside a controller of the electronic apparatus and connecting a general-purpose input/output (GPIO) port connected to the load switch and a pull-up resistor connected to a bias power source.

6. The method as claimed in claim 5, wherein in response to the switch being turned on and off repeatedly, an output voltage through the GPIO port is increased step by step.

7. The method as claimed in claim 6, wherein the performing of the soft start operation includes turning the switch on and off repeatedly in a frequency range of 50 KHz to 400 KHz.

8. An electronic apparatus comprising:
a connection unit to which an external apparatus is connectable;
a load switch connected to the connection unit;
a switch controller configured to automatically turn on the load switch in response to the external apparatus being connected; and
a controller configured to automatically recognize the external apparatus, and perform a control operation corresponding to the external apparatus, in response to the load switch being turned on,
wherein the switch controller includes:
a pull-up resistor connected to a bias power source;
a general-purpose input/output (GPIO) port connected to the load switch; and
a switch configured to connect the pull-up resistor and the GPIO port,
wherein, in response to the external apparatus being connected, the switch controller turns the switch on and off repeatedly.

9. The electronic apparatus as claimed in claim 8, wherein in response to the switch being turned on and off repeatedly, an output voltage through the GPIO port is increased step by step.

10. The electronic apparatus as claimed in claim 9, wherein the load switch includes:
a metal oxide silicon field effect transistor (MOSFET) switch; and
a bipolar junction transistor (BJT) switch,
wherein a base terminal of the BJT switch is connected to the GPIO port, and a collector terminal of the BJT switch is connected to a gate terminal of the MOSFET switch.

11. The electronic apparatus as claimed in claim 10, wherein a gate voltage of the MOSFET is gradually changed such that when a turn-on delay of the MOSFET is generated, the MOSFET restricts an inrush current into the MOSFET, and in response to the load switch being turned on, a soft start function is activated.

12. The electronic apparatus as claimed in claim 11, wherein the inrush current is gradually increased and reaches a maximum value at the end of a turn-on operation of the load switch, at which point the inrush current is abruptly reduced when a turn-on operation is completed.

13. The electronic apparatus as claimed in claim 9, wherein the switch controller turns the switch on and off repeatedly in a frequency range of 50 KHz to 400 KHz.

14. The electronic apparatus as claimed in claim 9, wherein the switch allows a current to flow from an input voltage terminal to an output voltage terminal, and in response to the switch being activated, current flows between said input and output voltage terminals, and in response to the switch being turned off, current does not flow between said input and output voltage terminals.

15. The electronic apparatus as claimed in claim 9, wherein the switch controller repeatedly turns the pull up resistor on and off at a high speed for a short duration of time so as to gradually increase the voltage of a capacitor connected to the controller.

16. The electronic apparatus as claimed in claim 9, wherein the switch controller is repeatedly turned on and off, and the pull-up resistor is turned on, a voltage of a capacitor between the switch and the switch controller is gradually increased, and an output of the GPIO port has a gradually increasing positive slope, when the pull-up resistor is turned off, the output of the GPIO port is constant.

* * * * *